United States Patent [19]

Schosek

[11] 4,309,122
[45] Jan. 5, 1982

[54] INSTALLATION ROD FOR AN UNDERGROUND PIPE INSTALLER DEVICE

[76] Inventor: William O. Schosek, 7942 Marx Dr., North Fort Myers, Fla. 33903

[21] Appl. No.: 65,724

[22] Filed: Aug. 10, 1979

[51] Int. Cl.³ ............................................. F16B 7/00
[52] U.S. Cl. .................................. 403/307; 403/343
[58] Field of Search ............. 403/307, 343, 299, 333; 285/334, 333, 390, 355

[56] References Cited

U.S. PATENT DOCUMENTS

| | | | |
|---|---|---|---|
| 154,444 | 8/1974 | Bauser | 403/333 X |
| 1,849,066 | 3/1932 | Bridges | 403/333 |
| 1,984,026 | 12/1934 | Little | 403/299 X |
| 2,834,625 | 5/1958 | Stanley et al. | 403/343 |
| 3,495,123 | 2/1970 | Raddatz | 403/343 X |
| 3,645,570 | 2/1972 | Johansson | 403/307 |
| 3,876,319 | 4/1975 | Meyer | 403/343 |

Primary Examiner—Andrew V. Kundrat
Attorney, Agent, or Firm—Alfred E. Wilson

[57] ABSTRACT

The present invention pertains to a coupled sectional rod assembly of a type for use in an underground pipe installer device for, first, forming an underground hole between two given points and, second, installing a pipe or the like in the hole. Each end of the rod includes a reduced diameter screw threaded stud portion for reception in one end of a coupler having the same outside diameter as the rod section. Both ends of the coupler conventionally include an unthreaded lead-in end portion. Both screw threaded-end stud portions of each rod section of the present invention include a shoulder portion connecting between the screw threaded studs and the main rod section length. Each shoulder portion is of a diameter substantially equal to the inner diameter of the unthreaded lead-in end portion for engagement therein when the threads are fully engaged in a coupler, for the purpose of supporting the unthreaded end portions against inward crimping under the very substantial radially inwardly directed forces applied to the rod assembly during the hole forming operation.

1 Claim, 3 Drawing Figures

INSTALLATION ROD FOR AN UNDERGROUND PIPE INSTALLER DEVICE

BACKGROUND OF THE PRESENT INVENTION

The present invention pertains to a rod section commonly used in coupled multiples for the purpose of forming an underground hole and then installing a pipe or the like through the length of the hole. This is accomplished by digging operating and target trenches on opposed sides of the area to be spanned by an underground pipe. A pipe installer device is properly positioned in the operator trench and a first rod section is disposed in the device from the back end. The first pipe section is driven forwardly by appropriate power means of the installer until the trailing end thereof closely approaches the installer back end. A second rod section is coupled to the trailing end and the forward drive operation is continued. Rod sections are continually coupled to the preceding section until the leading end thereof emerges into the target trench. A front end cap provided on the leading tip end is then removed and an adapter is threaded thereon which is fixed to an end of a pipe to be installed through the length of the hole. The direction of drive is then reversed and the pipe is pulled backwardly into the length of the formed hole.

The above procedure is generally conventional, however, a problem exists, the couplers, on occasions, become crimped along one or both peripheral edges to the rod sections in a manner so as to render them unusable. The operating trench must be dug to a length sufficiently longer than the installer device, 6 feet longer, for example, to permit the coupled addition of rod lengths as the pushing operation progresses as above described. It is, therefore, impractical to manually dig a longer trench, often to substantial depths, to accommodate a plurality of permanently locked together rod lengths, consequently, they are discarded. The rod lengths are formed of a very hard expensive material such as steel to withstand the very substantial forces to which they are subjected.

Therefore, one of the principal objects of the present invention is to provide a reduced diameter screw threaded stud portion on each end of each rod section with an unthreaded shoulder portion connecting between the screw threaded stud and the main length of the section. The shoulder portion is of a diameter to slidably engage in an unthreaded lead-in portion of the coupler in a manner so as to prevent inward crimping of the unthreaded peripheral lead-in end portion under the very substantial radially directed forces to which they are often subjected during the hole forming operation.

DESCRIPTION OF A PREFERRED EMBODIMENT

Figure 1:
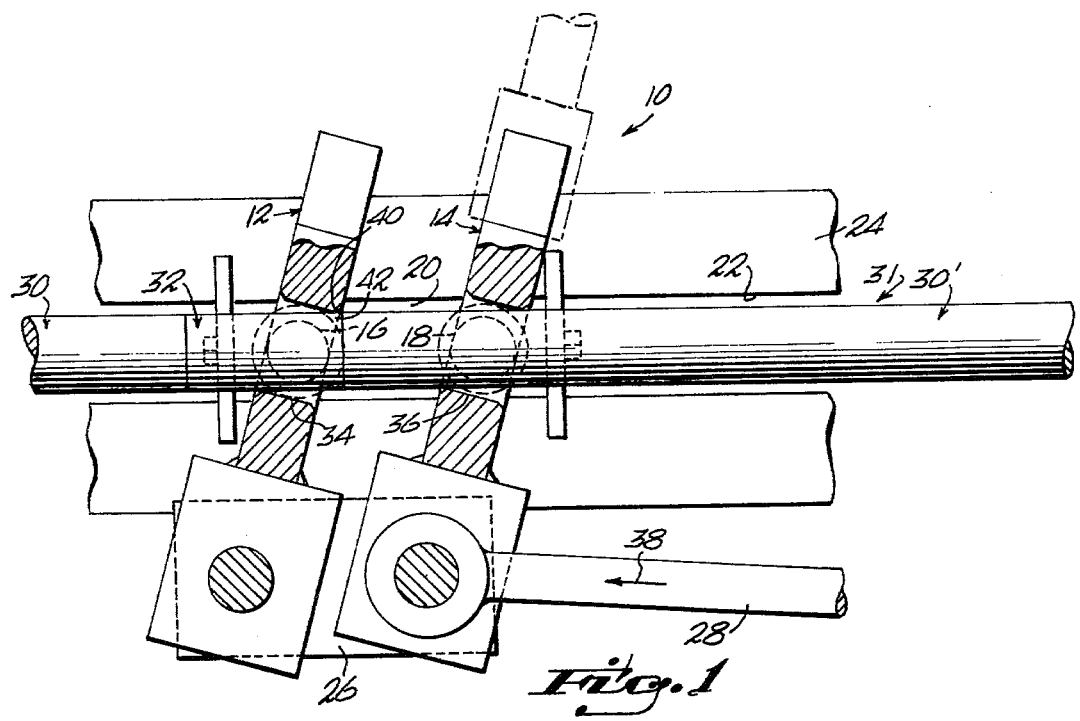
FIG. 1 is a fragmentary view of two coupled ends of a pipe installer rod assembly drivingly engaged in a pair of drive jaws of a type often employed in underground pipe installer devices.

With reference to FIG. 1 of the drawings the numeral 10 generally indicates a portion of an underground pipe installer employing a pair of reciprocating drive jaws 12, 14 centrally pivoted at 16, 18 in a slide carriage 20, slidably engaged in a pair of side slots, one shown at 22, in side walls, one illustrated at 24. The bottom ends of jaws 12, 14 are pivotally linked together at 26 and driven in common by a piston rod 28 of a hydraulic cylinder and piston assembly, not shown. The above structure forms no part of the present invention but is used to illustrate a typical "in use" application of the present invention.

A pair of identical rod sections 30, 30' of a rod assembly 31, endwisely joined by an interiorly threaded sleeve coupler 32, are engaged through central holes 34, 36 of the drive jaws 12, 14. In use a forward hole forming drive is provided by the piston rod 28. The forward drive, in the direction of arrow 38, causes the rod assembly 31 to be tightly frictionally engaged in central jaw holes 34, 36 and to also drive the coupled rod assembly 31 in the direction of arrow 38. When an obstruction such as a large solid rock is encountered in the hole forming operation, very substantial resistance forces are imparted to the rod assembly 31 and the frictional gripping forces of jaws 12, 14 on the rod assembly 31 increase in direct proportion to the resistance forces under the influence of the piston drive means 28.

Figure 3:
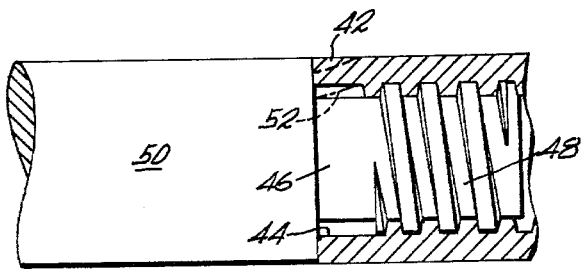
FIG. 3 is a fragmentary view similar to FIG. 2, illustrating a prior art structure.

Often one drive jaw edge such as 40, FIG. 1, engages one end portion 42 of a sleeve coupler 32. With reference to the "Prior Art" illustration, FIG. 3, the coupler end portions 42 are conventionally completely unsupported between the inner annular surface 44 thereof and an unthreaded inner portion 46 of a reduced diameter threaded stud end 48 of the rod section 50. Under heavy load conditions, such as an encounter with a solid rock, this results in a crimp, illustrated in broken lines at 52, being formed in the end portion 42 which permanently locks the coupling onto the rod section 50. When the opposite end of a coupler is similarly crimped to another rod section, the permanently coupled rods and coupler are generally discarded.

The rod sections such as 30 and 30' of the present invention are each provided with like opposed threaded end studs 61 of a reduced diameter, and a shoulder 60 formed between each stud and the main section length. Shoulder 60 is preferably of a diameter generally equal to the outer thread diameter and to provide a slip fit into the annular unthreaded lead-in skirt portion 62 of the coupler 32. The shoulder portion 60 is preferably of a length so as to penetrate the lead-in skirt portion 62 to a point closely adjacent to the outer thread end 64.

Figure 2:
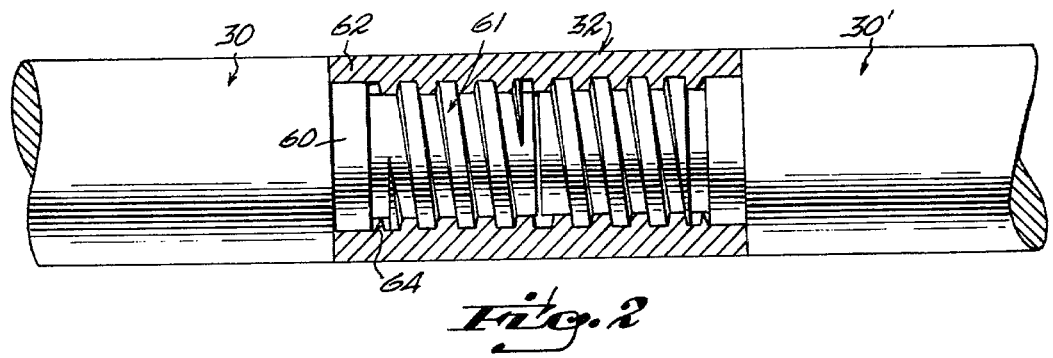
FIG. 2 is a view of the two coupled ends as in FIG. 1 with the coupler illustrated in cross section.

As further illustrated in FIG. 2, the shoulder portions 60, are integrally formed between the main rod length 30 and threaded end stud 61. As illustrated, the rod portions 30, 30' and coupler 32 are of like outer diameters and the threaded studs 61 are preferably of such lengths so to provide only a minimal spacing between opposed inner ends thereof when engaged in opposed coupling ends. The entire inner surface of the coupling is supported to a degree so as to prevent any crimping thereof from the forces of jaws 12, 14, particularly at their opposed end portions where the crimp lock problem occurs in the prior art structure.

I claim:

1. A plurality of rigid steel rod sections for multiple coupled end to end arrangements, for use in an underground pipe installer device having reciprocating drive jaws to tightly engage said rod sections to form an underground hole between two given points in a first direction of operation by the pipe installer device and to withdraw a pipe, attached to a leading end of a coupled arrangement, into the length of the hole in a second direction of operation, said rod sections comprising a plurality of main predetermined rod section lengths of a substantially uniform predetermined outer diameter and including an axial outwardly extending reduced diameter threaded stud portion from each end of each rod section length, and an annular shoulder portion of a predetermined length and of a reduced diameter relative to said main length diameter and equal to the outer thread diameter of each said stud portion, and formed between said main length and the threaded stud portion; said threaded stud portion of each rod length being receivable in screw threaded engagement within one end portion of each of a plurality of standard rigid steel sleeve couplers which are provided and are of a same substantially uniform predetermined outer diameter as said main rod lengths and including a main mating continuously threaded interior portion along a main central length and terminating in an unthreaded open lead-in annular skirt portion at each end of a predetermined depth and diameter to receive one of said annular shoulders as a snug fit, the threaded stud and shoulder portions of each rod section length being receivable within each end of each of the couplers, each of said threaded studs being of such a length as to define a relatively short span between opposed end faces thereof of a length less than the length of the thread crests on said threaded studs when a plurality of rod lengths are fully threaded into each end of the couplers.

* * * * *